(12) United States Patent
Fedurco et al.

(10) Patent No.: US 10,604,672 B2
(45) Date of Patent: Mar. 31, 2020

(54) METAL-ADHESIVE, HYDROPHOBIC AND ELECTRICALLY CONDUCTIVE COATING, OF USE IN PARTICULAR AS PAINT FOR FUEL CELL BIPOLAR PLATE

(71) Applicant: COMPAGNIE GENERALE DES ETABLISSEMENTS MICHELIN, Clermont-Ferrand (FR)

(72) Inventors: Milan Fedurco, Clermont-Ferrand (FR); Antonio Delfino, Clermont-Ferrand (FR); David Olsommer, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 15/778,720

(22) PCT Filed: Nov. 24, 2016

(86) PCT No.: PCT/FR2016/053083
§ 371 (c)(1),
(2) Date: May 24, 2018

(87) PCT Pub. No.: WO2017/089715
PCT Pub. Date: Jun. 1, 2017

(65) Prior Publication Data
US 2018/0355207 A1    Dec. 13, 2018

(30) Foreign Application Priority Data
Nov. 26, 2015 (FR) ..................... 15 61416

(51) Int. Cl.
| | | |
|---|---|---|
| *H01M 8/00* | (2016.01) | |
| *H01M 8/0228* | (2016.01) | |
| *C09D 127/16* | (2006.01) | |
| *C09D 5/08* | (2006.01) | |
| *C09D 5/24* | (2006.01) | |
| *C09D 163/10* | (2006.01) | |
| *C09D 7/40* | (2018.01) | |
| *H01M 8/021* | (2016.01) | |
| *C08K 3/04* | (2006.01) | |
| *H01M 8/1018* | (2016.01) | |

(52) U.S. Cl.
CPC ............ *C09D 127/16* (2013.01); *C09D 5/08* (2013.01); *C09D 5/24* (2013.01); *C09D 7/69* (2018.01); *C09D 163/10* (2013.01); *H01M 8/021* (2013.01); *H01M 8/0228* (2013.01); *C08K 3/04* (2013.01); *H01M 2008/1095* (2013.01)

(58) Field of Classification Search
CPC ... H01B 1/00; H01B 1/20; H01B 1/24; C09D 5/24; H01M 8/00; H01M 8/0228
See application file for complete search history.

(56) References Cited

U.S. PATENT DOCUMENTS

| | | | |
|---|---|---|---|
| 4,111,894 A * | 9/1978 | Gergen | C08L 71/123 |
| | | | 524/505 |
| 4,690,836 A | 9/1987 | Clarke et al. | |
| 4,696,764 A | 9/1987 | Yamazaki | |
| 6,248,467 B1 | 6/2001 | Wilson et al. | |
| 6,299,801 B1 * | 10/2001 | Handa | H01C 7/027 |
| | | | 219/541 |
| 6,372,376 B1 | 4/2002 | Fronk et al. | |
| 6,379,476 B1 | 4/2002 | Tarutani et al. | |
| 6,537,359 B1 | 3/2003 | Spa | |
| 6,864,007 B1 | 3/2005 | Iqbal et al. | |
| 7,365,121 B2 | 4/2008 | Huang et al. | |
| 7,910,262 B2 | 3/2011 | Akikusa et al. | |
| 9,515,324 B2 | 12/2016 | Suzuki et al. | |
| 10,002,719 B2 * | 6/2018 | Ha | H01G 11/52 |
| 2001/0021547 A1 | 9/2001 | Sakairi | |
| 2002/0136941 A1 * | 9/2002 | Bonnet | B82Y 30/00 |
| | | | 252/511 |
| 2002/0177027 A1 | 11/2002 | Yeager et al. | |
| 2004/0211943 A1 | 10/2004 | Okahara et al. | |
| 2005/0244700 A1 | 11/2005 | Abd Elhamid et al. | |
| 2006/0046125 A1 | 3/2006 | Lai | |
| 2006/0240305 A1 | 10/2006 | Huang | |
| 2006/0267235 A1 | 11/2006 | Ma et al. | |
| 2008/0185559 A1 | 8/2008 | Yoon et al. | |
| 2008/0299419 A1 | 12/2008 | Zhamu et al. | |
| 2009/0317710 A1 | 12/2009 | Douglas et al. | |
| 2010/0263533 A1 | 10/2010 | Gadkaree et al. | |
| 2011/0186340 A1 | 8/2011 | Kuramoto et al. | |

(Continued)

FOREIGN PATENT DOCUMENTS

| | | |
|---|---|---|
| CN | 102086338 A | 6/2011 |
| EP | 2 884 570 A1 | 6/2015 |

(Continued)

OTHER PUBLICATIONS

C. Turan, et al., "Effect of manufacturing processes on contact resistance characteristics of metallic bipolar plates in PEM fuel cells", International Journal of Hydrogen Energy, vol. 36, No. 19, pp. 12370-12380 (2011).

(Continued)

*Primary Examiner* — Mark Kopec
(74) *Attorney, Agent, or Firm* — Venable LLP

(57) ABSTRACT

A solid composition, of use in particular on any type of metallic substrate as a hydrophobic, electrically conductive, metal-adhesive coating, comprises at least (% by weight of composition): as conductive filler, from 75% to 95% of electrically conductive microparticles, the weight-average size of which is between 1 μm and 100 μm; and as hydrophobic, metal-adhesive polymer matrix, from 5% to 25% of a polymer matrix denoted "P", comprising at least 2 different polymers P1, a thermoplastic fluoropolymer, the weight-average molecular weight of which, denoted "Mw", is between 100 000 and 1 000 000 g/mol; and P2, a thermoset resin, the glass transition temperature of which is between 30° C. and 150° C. A steel bipolar plate, especially made of stainless steel, for a fuel cell, may be coated with such a composition.

10 Claims, No Drawings

(56) References Cited

U.S. PATENT DOCUMENTS

| | | | |
|---|---|---|---|
| 2013/0295432 A1 | 11/2013 | Inoue | |
| 2014/0370382 A1* | 12/2014 | Lim | C08G 73/1046 429/217 |
| 2015/0140204 A1 | 5/2015 | Suzuki et al. | |
| 2016/0096975 A1* | 4/2016 | Saito | C09D 5/03 427/180 |
| 2016/0318342 A1 | 11/2016 | Delfino | |
| 2016/0322661 A1 | 11/2016 | Guimet et al. | |
| 2017/0050468 A1 | 2/2017 | Delfino | |
| 2018/0009264 A1 | 1/2018 | Delfino | |
| 2018/0358631 A1* | 12/2018 | Fedurco | H01M 8/021 |

FOREIGN PATENT DOCUMENTS

| | | |
|---|---|---|
| WO | 02/13300 A1 | 2/2002 |
| WO | 2005/006472 A1 | 1/2005 |
| WO | 2015/107276 A1 | 7/2015 |

OTHER PUBLICATIONS

U.S. Appl. No. 16/319,049, available on USPTO Pair system.

V. Delhorbe, et al., "Fluorohexane network and sulfonated PEEK based semi-IPNs for fuel cell membranes", Journal of Membrane Science, vol. 389, pp. 57-66 (2012).

L. Chikh, et al., "(Semi-)Interpenetrating polymer networks as fuel cell membranes", Journal of Membrane Science, vol. 368, pp. 1-17 (2011).

McKeen, "Effect of Temperature and Other Factors on Plastics and Elastomers", 2008, 2nd Ed., p. 1 (Year: 2008).

\* cited by examiner

METAL-ADHESIVE, HYDROPHOBIC AND ELECTRICALLY CONDUCTIVE COATING, OF USE IN PARTICULAR AS PAINT FOR FUEL CELL BIPOLAR PLATE

1. FIELD OF THE INVENTION

The field of the present invention is that of solid compositions of use especially as hydrophobic, electrically conductive, metal-adhesive coating.

It relates more particularly to the use of such compositions, sometimes also termed "paints", on at least partially metallic substrates, in particular on steel bipolar plates for fuel cells with ion-exchange polymer membranes, referred to as "PEMs" (for proton exchange membrane).

2. PRIOR ART

It will be recalled first of all that a PEM fuel cell is composed of a stack of individual electrochemical cells connected electrically in series and which each develop a certain voltage, in general of between 0.3 and 1.1 volts. The total voltage developed by the stack is therefore equal to the sum of the individual voltages, for example around a few hundred volts for fuel cells targeting applications in the transport field.

Each individual electrochemical cell is usually composed of the superposition of five layers: a polymer film, one zone of which forms an ion-exchange membrane, two electrodes comprising chemical elements necessary for the development of the electrochemical reaction, such as for example platinum, and two gas diffusion layers (GDL) that make it possible to ensure a homogeneous diffusion of the gases used over the whole of the surface of the ion-exchange membrane.

The supply of the gases is ensured by plates that are generally referred to as "bipolar plates" as they are in contact with the anode of one cell and with the cathode of the adjacent cell.

These bipolar plates perform two very different functions. It is known that it is necessary to supply the cell with fuel gas and oxidant gas, that is to say with hydrogen and with air or with pure oxygen, and that it is also necessary to cool same, that is to say to pass a coolant fluid such as water through it. One of the functions of the bipolar plates is to enable these various fluids, required for the operation of the fuel cell, to be conveyed. Moreover, the bipolar plates also perform an electrical function: ensuring electrical conduction between the anode and the cathode of each of the adjacent electrochemical cells.

These different functions, conveying fluids and conducting electricity, provide the specifications which the materials used for producing these bipolar plates must meet. The materials used must have a very high electrical conductivity, they must also be leaktight against the fluids used and demonstrate very high chemical stability with regard to these fluids.

In addition, the bipolar plates must have sufficient mechanical characteristics to allow the superposition of a large number of individual electrochemical cells and associated bipolar plates and the holding together of the assembly by compression between end plates using tie bars. They must therefore have sufficient mechanical characteristics to withstand this compression.

Graphite is commonly used, since this material offers both high electrical conductivity and is chemically inert to the fluids used. By way of example, patent application WO 2005/006472 shows a possible embodiment of such bipolar plates. It is seen that they are composed of the superposition of two relatively rigid graphite plates, with the interposition of a relatively flexible film produced from graphite material, in order to adapt to the thickness tolerances of the different layers. The graphite plates comprise the networks of channels that are necessary for the distribution of the fuel gases and oxidant gas, and the network of channels allowing each bipolar plate to be passed through by a coolant fluid such as water. Unfortunately, the rigid elements involved in the construction of the graphite bipolar plates are fairly fragile to impacts, in particular during handling when assembling the cell. The layer made of flexible graphite material, referred to previously, is also particularly difficult to handle on an industrial scale. This all significantly detrimentally affects the costs of manufacturing such bipolar plates.

Steel bipolar plates, especially made of stainless steel or covered with stainless steel, are also known for this type of application. While they are certainly much more mechanically robust than graphite plates, they must nonetheless be covered with protective coatings, protecting the metal from corrosion, capable of adhering to the metal while affording sufficient electrical conductivity, which makes the formulation of such coatings particularly complex to develop.

Such bipolar plates and/or the protective coatings thereof have for example been described in the patent documents U.S. Pat. Nos. 6,372,376, 6,379,476, 6,537,359, 7,365,121, 7,910,262, WO 02/13300.

The subject of the present invention is that of proposing a novel solid composition which, especially as protective coating for bipolar plate, meets the requirements described above, advantageously affording this coating not only suppleness and flexibility but also particularly advantageous self-sealing properties which ultimately give it improved endurance.

3. BRIEF DESCRIPTION OF THE INVENTION

Thus, according to a first subject, the present invention relates to a solid composition of use in particular as hydrophobic, electrically conductive, metal-adhesive coating, comprising at least (% by weight of composition):

- as conductive filler, from 75% to 95% of electrically conductive microparticles, the weight-average size of which is between 1 μm and 100 μm;
- as hydrophobic, metal-adhesive polymer matrix, from 5% to 25% of a polymer matrix denoted "P", comprising at least 2 different polymers:
  - a) P1: a thermoplastic fluoropolymer, the weight-average molecular weight of which, denoted "Mw", is between 100 000 and 1 000 000 g/mol;
  - b) P2: a thermoset resin, the glass transition temperature of which is between 30° C. and 150° C.

The invention also relates to the use of such a composition as hydrophobic, electrically conductive, metal-adhesive coating, on a substrate, at least the surface of which is at least partially metallic, said substrate being in particular a steel bipolar plate for fuel cell.

The invention also relates to any substrate, at least the surface of which is at least partially metallic, at least said metallic part being coated with a solid composition according to the invention. The invention relates in particular to a steel bipolar plate for fuel cell, coated with a solid composition according to the invention.

The invention and its advantages will be easily understood in the light of the detailed description and exemplary embodiments which follow.

4. DETAILED DESCRIPTION OF THE INVENTION

Unless expressly indicated otherwise, all the percentages (%) indicated in the present application are percentages by weight (or by mass, in an equivalent manner).

The expression "x and/or y" means "x" or "y" or both (i.e. "x and y"). Any range of values denoted by the expression "between a and b" represents the field of values ranging from more than "a" to less than "b" (that is to say limits "a" and "b" excluded), whereas any range of values denoted by the expression "from a to b" means the field of values ranging from "a" up to "b" (that is to say including the strict limits "a" and "b").

A first subject of the present invention is therefore a solid composition, of use in particular as hydrophobic (in other words, anti-corrosion), electrically conductive, metal-adhesive protective coating, comprising at least:
- as conductive filler, from 75% to 95% of electrically conductive microparticles, the weight-average size of which is between 1 μm and 100 μm;
- as hydrophobic, metal-adhesive polymer matrix, from 5% to 25% of a polymer matrix denoted "P", comprising at least 2 different polymers:
  a) P1: a (at least one) thermoplastic fluoropolymer, the weight-average molecular weight of which, denoted "Mw", is between 100 000 and 1 000 000 g/mol;
  b) P2: a (at least one) thermoset resin, the glass transition temperature of which is between 30° C. and 150° C.

A first essential characteristic of this composition of the invention is therefore that of comprising, as conductive filler, from 75% to 95%, preferably from 80% to 95%, of electrically conductive microparticles, the weight-average size of which is between 1 μm and 100 μm. This weight-average size is preferentially between 1 and 50 μm, more preferentially between 2 and 25 μm.

"Size" is intended to mean here the diameter in the case of spherical particles, for example in powder form, or the length (or longest dimension) in the case of anisometric particles, for example in the form of rods or platelets.

Various known methods are applicable for the analysis of the particle size and the calculation of the mean size of the microparticles (or mean diameter for microparticles assumed to be substantially spherical), for example by laser diffraction (for example, according to Standard ISO 8130-13).

Use may also simply and preferentially be made of an analysis of the particle size by mechanical sieving; the operation consists in sieving a defined amount of sample (for example 200 g) on a vibrating table for 30 min with different sieve diameters (for example, according to a progressive ratio equal to 1.26, with meshes of 500, 400, . . . , 100, 80, 63 μm, etc.); the oversize collected on each sieve is weighed on a precision balance; the % of oversize for each mesh diameter relative to the total weight of product is deduced therefrom; the median size (or median diameter) is finally calculated in a known way from the histogram of the particle size distribution.

These microparticles may be organic or inorganic, for example metallic. By way of examples of such metallic microparticles, mention may be made of nickel particles, or else nitrides of metals such as nickel, aluminium or titanium.

Preferably, these microparticles comprise, i.e. are at least in part (i.e. partially or totally) composed of, graphite microparticles. The latter may be in powder and/or lamellar form, for example in the form of exfoliated graphite, preferably of weight-average size of between 2 and 15 μm and of thickness between 50 and 150 nm (nanometres).

Another essential characteristic of the composition of the invention is that of comprising, as hydrophobic, metal-adhesive polymer matrix, from 5% to 25%, preferably from 5% to 20%, of a polymer matrix denoted "P", comprising at least 2 different polymers:
- P1: for the hydrophobic (anti-corrosion) function, a (at least one, that is to say one or more) thermoplastic fluoropolymer, the weight-average molecular weight of which, "Mw", is between 100 000 and 1 000 000 g/mol;
- P2: for the adhesive function, a (at least one, that is to say one or more) thermoset resin, the glass transition temperature (Tg) of which is between 30° C. and 150° C.

The molecular weight Mw of P1 is preferably within a range from 200 000 to 800 000 g/mol.

According to another preferential embodiment, the polymer P1 comprises at least, that is to say consists at least in part (i.e. partially or entirely) of, a homopolymer or a copolymer of vinylidene fluoride (abbreviated to PVDF). This type of polymer is well known and commercially available, generally in powder or pellet form, for example from Solvay under the trade name Solef. It is especially a customary binder known for bipolar plates not made of metal but made of graphite.

Preferably, the thermoplastic fluoropolymer P1 has a glass transition temperature (Tg) of less than 50° C., more preferentially less than 0° C. According to another preferential embodiment, whether or not combined with the preceding embodiment, it has a melting point (Tm) of less than 250° C., more preferentially less than 200° C.

Generally speaking, "resin" or "thermoset resin" P2 is intended to mean, in the present application, the (at least one) resin itself and any composition based on this resin (or mixture of resins) and comprising at least one additive (that is to say one or more additive(s)). This resin, in the solid composition or coating of the invention, is of course crosslinked (thermoset), in other words is in the form of a network of three-dimensional bonds, in a state specific to "thermosetting" polymers (as opposed to "thermoplastic" polymers).

Preferably, the glass transition temperature (Tg) of the thermoset resin P2 is between 80° C. and 150° C., more preferentially between 90° C. and 130° C.

The thermosetting resin (starting product) used is generally liquid at 20° C.; it is preferentially used with a solvent, in particular styrene, in order to adjust the viscosity thereof according to the particular conditions of use of the invention.

The term "liquid" in the present application describes any substance which, at room temperature (20° C.) and under atmospheric pressure, is in the liquid state, that is to say has the ability to eventually, i.e. to give a concrete idea, in less than one hour, assume the shape of its container; in contrast, any substance not meeting this criterion is considered to be "solid" (at 20° C.).

This is, by definition, a crosslinkable (i.e. curable) resin able to be crosslinked or cured by any known method, for example by radiation or heat treatment, generally in the presence of a polymerization initiator system such as a photoinitiator or a thermoinitiator. Use is preferably made of a thermal-type initiator, more preferentially an organic peroxide such as a peroxyester, by way of example a methyl ethyl ketone peroxide (MEKP), a cumene hydroperoxide (CHP) or else a mixture of both at different ratios, with which initiator a crosslinking accelerator, for example of aniline type (e.g. dimethylaniline or DMA), or a crosslinking promoter, for example a cobalt compound (e.g. cobalt naphthenate), may be combined.

Preferably, the resin P2 comprises, that is to say consists at least in part (i.e. partially or entirely) of, a vinyl ester resin, in particular of epoxy vinyl ester type. Use is more particularly made of an epoxy vinyl ester resin, which, at least in part, is based on (i.e. grafted onto a structure of this type) novolac (also known as phenoplast) and/or bisphenol, in other words preferentially a vinyl ester resin based on novolac, bisphenol, or novolac and bisphenol, more preferentially still a vinyl ester resin of bisphenol epoxy type.

An epoxy vinyl ester resin based on novolac (the part between brackets in formula I below) corresponds for example, in a known way, to the following formula (I):

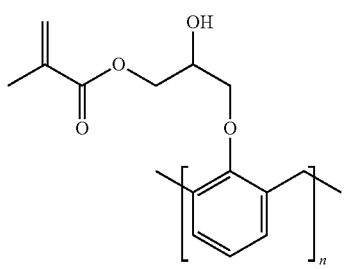

An epoxy vinyl ester resin based on bisphenol A (the part between brackets in formula (II) below) corresponds for example to the formula (the "A" serving as a reminder that the product is manufactured using acetone):

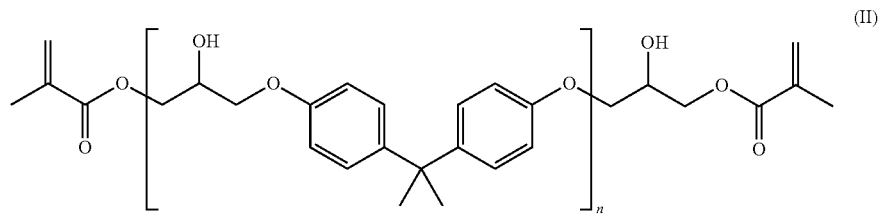

An epoxy vinyl ester resin of bisphenol type has shown excellent results; by way of examples of such a resin, mention may especially be made of the resins of the DION 9100 series, sold by Reichhold (containing approximately 45% of styrene), for various applications, in particular for the manufacture of laminated composites based on glass fibres.

By virtue of its specific Tg range, the resin P2 is able to confer upon the coating not only suppleness and flexibility but also self-sealing properties by virtue of a high level of deformability, which constitutes a noteworthy advantage for anti-corrosion applications, in particular for an application in paint for fuel cell bipolar plates. It also limits the permeability of this coating or of this paint at high temperature.

The melting point (Tm) and glass transition temperature (Tg) indicated above are measured in a known manner by DSC (Differential Scanning calorimetry), at the second pass, for example, and unless otherwise indicated in the present application, according to standard ASTM D3418 of 1999 (822-2 DSC apparatus from Mettler Toledo; nitrogen atmosphere; samples first brought (10° C./min) from −80° C. to the maximum targeted temperature (for example 200° C.), then rapidly cooled (in 10 min) down to −80° C., before final recording of the DSC curve from −80° C. to the maximum targeted temperature (for example 200° C.), at a ramp of 10° C./min).

The weight-average molecular weight (Mw) is measured by SEC (Size Exclusion Chromatography). As a reminder, this technique makes it possible to separate macromolecules in solution according to their size through columns filled with a porous gel. The macromolecules are separated according to their hydrodynamic volume, the bulkiest being eluted first.

SEC is coupled to a refractometer; it gives, in this case, relative information. Starting from commercial standard products, the various number-average molar masses (Mn) and weight-average molar masses (Mw) that characterize the distribution of the molar masses of the polymer may be determined and the polydispersity index (PI=Mw/Mn) calculated via a Moore calibration. There is no specific treatment of the polymer sample before analysis. The latter is simply dissolved in the elution solvent at a concentration of approximately 1 g/l. The solution is then filtered through a filter with a porosity of 0.45 μm before injection. The apparatus used is a Waters Alliance chromatographic line. The elution solvent is DMAC (dimethylacetamide), the flow rate is 0.7 ml/min, the temperature of the system is 50° C. and the analysis time is 90 min. A set of four WATERS columns (1 Styragel HMW7 column+1 Styragel HMW6E column+2 Styragel HT6E columns) is used. The volume of the solution of polymer sample injected is 100 μl. The detector is a Waters 2414 differential refractometer and the software for making use of the chromatographic data is the Waters Empower system. The calculated average molar masses are relative to a calibration curve produced from PSS Ready Cal-Kit commercial polystyrene standards.

In the composition of the invention, the P2/P1 weight ratio is preferably between 0.2 and 5, more preferentially between 0.4 and 2.5.

The content (% by weight) of polymer P1 in the composition is preferably between 1% and 15%, more preferentially between 2 and 10%; the content of resin P2, for its part, is preferentially between 2% and 15%, more preferentially between 5 and 12%.

The solid composition of the invention, described above, may optionally comprise various additives, known especially to form part of the formulation of coatings or paints for fuel cell bipolar plates, for example adhesion promoters or anti-corrosion agents.

The solid composition of the invention, described above, is of use on any type of substrate, at least the surface of which is (at least in part) metallic, as hydrophobic (in other words having anti-corrosion properties), electrically conductive, metal-adhesive protective coating.

In order to deposit the solid composition of the invention on such a substrate, use is preferentially made of a process comprising the following steps:

in a first container, dissolve the polymer P1 in an organic solvent of this polymer;

in a second container, disperse (that is to say, suspend) the electrically conductive microparticles in this solvent of the polymer P1;

add, in the first container, the resin (or resin composition) P2 in the liquid state;

mix the contents of the first and second containers, then deposit the mixture (suspension) obtained in this way on the substrate;

crosslink the resin and remove all solvent, in order to obtain the targeted final coating in the solid state.

The organic solvent of the fluoropolymer P1 is preferably selected from the group consisting of tetrahydrofuran (THF), methyl ethyl ketone (MEK), dimethylformamide (DMF), dimethylacetamide (DMA), dimethyl sulfoxide (DMSO), tetramethyl urea (TMU), N-methyl-2-pyrrolidone (NMP), N-ethyl-2-pyrrolidone (NEP), trimethyl phosphate and mixtures of such solvents; more preferentially, this solvent is NMP.

In the first container, the resin (or resin composition) P2 is added in the liquid state, as is or preferably in a suitable solvent, more preferentially in styrene; the solvent advantageously makes it possible, according to particular embodiments of the invention, to adjust the viscosity of the resin, and therefore that of the final paint in the suspension state, for optimal application of the latter.

The liquid mixture may be deposited on the metallic substrate according to various general methods well known to those skilled in the art, for example by applying by means of a brush, by submerging in a bath, or else by spraying.

The crosslinking of the resin P2, and therefore solidification of the composition of the invention, may be carried out by any suitable method. It is preferably carried out by heating, typically to a temperature greater than 100° C., which makes it possible to remove the solvent(s) used at the same time as the crosslinking occurs. Said crosslinking is preferably performed in the presence of a thermal polymerization initiator system, for example a peroxide compound.

The composition of the invention is most particularly of use as paint for fuel cell bipolar plate, this plate being for example made of steel, more preferentially made of stainless steel optionally coated with a thin metallic layer (thus intermediate layer) made of another metal such as, for example, nickel, as is explained in more detail in the following exemplary embodiments.

The thickness of the coating of solid composition according to the invention on such a bipolar plate is preferably between 10 and 60 μm, more preferentially between 15 and 50 μm.

When the stainless steel is covered beforehand with an intermediate layer made of another metal, for example nickel, this intermediate layer has a thickness preferably of between 2 and 20 μm, more preferentially in a range from 5 to 15 μm.

5. EXEMPLARY EMBODIMENTS OF THE INVENTION

In the following examples, use is made of a solid composition according to the invention as paint (coating) for a PEM fuel cell bipolar plate.

A stainless steel plate (316 L, dimensions 25×25 cm) was coated beforehand with a thin intermediate layer of nickel electrolytically, as is known, with a thickness equal to approximately 10 μm. The paint was then deposited according to the process described above, by successively applying the following detailed steps.

a) Preparation of a Solution of PVDF (at 5% in NMP)

10 g of PVDF in powder form (Solef 5320 from Solvay, Mw equal to approximately 530 000; Tg equal to approximately −40° C.; Tf equal to approximately 160° C.) then 200 ml of anhydrous NMP (Biotech grade, Sigma-Aldrich) were added in a first container (100 ml brown-tinted glass bottle fitted with a lid). Everything was stirred (magnetic stirrer, overnight) until the PVDF was entirely dissolved.

b) Preparation of a Suspension of Conductive Microparticles (Conductive Mixture)

In a second container (250 ml glass bottle fitted with a lid), 12.5 g of graphite powder (M850 from Asbury Carbons), of a mean size equal to approximately 5 μm, and 6.25 g of expanded graphite in lamellar form (MX15 from Timcal, Switzerland), of a mean size equal to approximately 17 μm, were dispersed in 50 ml of NMP, with everything being stirred overnight. 6.25 g of nickel particles (mean size 3 μm; Sigma-Aldrich product no. 266981, 99.7% purity) were then added to this graphite suspension, to obtain a composition having the appearance of a semi-solid paste, everything being stirred (without magnetic stirrer bar) for 5 min before introducing the mixture of polymers prepared in the following step c).

c) Preparation of the Liquid PVDF/Vinyl Ester Solution (Polymer Mixture)

2.1 g of vinyl ester resin (Dion 9100 from Reichhold, Germany, containing 45% styrene; Tg equal to approximately 105° C.) were then added to 60.2 g of 5% PVDF solution prepared in step a) in the first 100 ml container, everything being stirred (magnetic stirrer bar) for 5 min. Finally, 0.2 ml of CHP thermoinitiator with cobalt promoter (Trigonox 239 from Akzo Nobel, 45% solution) was added and the resulting solution (polymer mixture) was stirred for 2 min.

d) Addition of the Polymer Mixture to the Conductive Mixture

Finally, the polymer solution prepared in step c) above was carefully poured (final rinsing of the first container with 15 ml of NMP solvent) into the second container containing the suspension of microparticles. The second container was closed and stirred for 5 min (without magnetic stirrer bar). At this stage, the final mixture or paint in the suspension state had the following composition (% by weight): 12.5 g of M850 (41.51%), 6.25 g of MX15 (20.76%), 6.25 g of Ni (20.76%), 2.1 g of Dion 9100 (6.98%) and 3.01 g of PVDF Solef 5320 (10%), everything giving 30.11 g (100%) of solid.

e) Deposition of the Paint on Bipolar Plate

Samples of the paint prepared in this way were sprayed onto bipolar plates by means of a pneumatic spraygun (Air Gupsa AZ3 HTE2 from Anest Iwate Group, Italy) using compressed nitrogen (2.5 bar) as carrier gas. The plates were arranged vertically in an oven preheated to 120° C., then they were heat treated at this temperature for 60 min. Once the treatment had ended, and the plates had cooled to room temperature (20° C.), the mean (over 5 measurements) thickness of the paint deposited in this way in the solid state (with all solvent removed) was approximately 30 μm.

f) Electrical Conductivity Measurements (ICR Tests)

Each sample of bipolar plate tested, coated in this way, was arranged "sandwiched" between two fuel cell GDL layers (TGP-H-60 from Torray), themselves arranged between two gold-coated copper electrodes (each with a useful contact surface area of 10 cm$^2$) supplied by a measurement apparatus (AOIP OM 15 type micro ohmmeter) injecting a current of 1 A into the circuit between the two electrodes.

The electrical conductivity was characterized by calculating what is referred to as the interfacial contact resistance or ICR (in mΩ·cm$^2$) between plate and GDL as a function of the contact pressure (50 to 200 N/cm$^2$) applied over the whole of the plate/GDL/electrodes assembly during the measurement. Such a method is well known and has been described in numerous publications, for example in "*Effect of manufacturing processes on contact resistance characteristics of metallic bipolar plates in PEM fuel cells*", *International Journal of Hydrogen Energy* 36 (2011), 12370-12380 (see especially paragraph 2.3), or else in patent application WO 02/13300 (see especially FIGS. 1 and 2).

The results obtained (see table below) are excellent for those skilled in the art: they have immediately, without particular optimization, proven to be just as good as those obtained for a commercially available paint (Acheson paint from Henkel, given in brackets) for the same operating conditions.

TABLE

| ICR (mΩ · cm$^2$)/Contact pressure (N/cm$^2$) | | | |
|---|---|---|---|
| 50 N/cm$^2$ | 100 N/cm$^2$ | 150 N/cm$^2$ | 200 N/cm$^2$ |
| 22.8 | 16.3 | 13.6 | 11.5 |
| (20.8) | (15.6) | (14.6) | (13.5) |

Comparative tests were carried out without resin P2, that is to say in which the same amount of polymer P1 (PVDF) was added to replace the missing resin P2 (vinyl ester); in other words, the polymer P1 made up the whole (100%) of the polymer matrix P (P2/P1 weight ratio equal to zero).

While the electrical conductivity proved to be substantially equivalent, it was observed, in contrast, that, after operation for 100 hours in a PEM fuel cell, the coating of the plate had degraded with partial surface detachment, entirely visible to the naked eye, of conductive microparticles, which was not the case in the presence of the resin P2.

In conclusion, the invention makes it possible to obtain a coating with high electrical conductivity, at least as good as that of known prior solutions, having high properties of adhesion to metal and a strong hydrophobicity, which is a guarantee of very good anti-corrosion properties, this coating also having suppleness and flexibility, and also advantageous self-sealing properties which confer upon it improved endurance.

The invention claimed is:

1. A hydrophobic, electrically conductive, metal-adhesive coating comprising a solid composition comprising at least:
   from 75% to 95% of electrically conductive microparticles, the weight-average size of which is between 1 μm and 100 μm; and
   from 5% to 25% of a polymer matrix P, comprising at least two different polymers P1 and P2,
   wherein P1 is a thermoplastic fluoropolymer, the weight-average molecular weight Mw of which is between 100,000 and 1,000,000 g/mol,
   wherein P2 is a thermoset resin, the glass transition temperature of which is between 30° C. and 150° C.,
   wherein % is by weight of the solid composition, and
   wherein the coating coats a steel bipolar plate for a fuel cell.

2. The hydrophobic, electrically conductive, metal-adhesive coating according to claim 1, wherein the steel is a stainless steel.

3. The hydrophobic, electrically conductive, metal-adhesive coating according to claim 2, wherein the stainless steel is coated with a layer of nickel.

4. A steel bipolar plate for a fuel cell, wherein the steel bipolar plate is coated with a solid composition comprising at least:
   from 75% to 95% of electrically conductive microparticles, the weight-average size of which is between 1 μm and 100 μm; and
   from 5% to 25% of a polymer matrix P, comprising at least two different polymers P1 and P2,
   wherein P1 is a thermoplastic fluoropolymer, the weight-average molecular weight Mw of which is between 100,000 and 1,000,000 g/mol,
   wherein P2 is a thermoset resin, the glass transition temperature of which is between 30° C. and 150° C., and
   wherein % is by weight of the solid composition.

5. The steel bipolar plate for a fuel cell according to claim 4, wherein a thickness of the coating of solid composition is between 10 and 60 μm.

6. The steel bipolar plate for a fuel cell according to claim 5, wherein the thickness of the coating of solid composition is between 15 and 50 μm.

7. The steel bipolar plate for a fuel cell according to claim 4, wherein the steel is a stainless steel.

8. The steel bipolar plate for a fuel cell according to claim 7, wherein the stainless steel is coated with a layer of nickel.

9. The steel bipolar plate for a fuel cell according to claim 8, wherein a thickness of the layer of nickel is between 2 and 20 μm.

10. The steel bipolar plate for a fuel cell according to claim 9, wherein the thickness of the layer of nickel is in a range from 5 to 15 μm.

* * * * *